(12) United States Patent
Rogers

(10) Patent No.: US 9,941,550 B2
(45) Date of Patent: Apr. 10, 2018

(54) BATTERY FIELD DISCONNECT METHOD

(75) Inventor: Kyle W. Rogers, Stamford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 722 days.

(21) Appl. No.: 14/396,004

(22) PCT Filed: Apr. 23, 2012

(86) PCT No.: PCT/US2012/034633
§ 371 (c)(1),
(2), (4) Date: Oct. 21, 2014

(87) PCT Pub. No.: WO2013/162493
PCT Pub. Date: Oct. 31, 2013

(65) Prior Publication Data
US 2015/0295282 A1   Oct. 15, 2015

(51) Int. Cl.
| B23K 11/24 | (2006.01) |
| H01M 10/42 | (2006.01) |
| H02H 7/18 | (2006.01) |
| H01M 10/0525 | (2010.01) |
| H01M 10/48 | (2006.01) |

(52) U.S. Cl.
CPC .......... *H01M 10/4257* (2013.01); *H02H 7/18* (2013.01); *H01M 10/0525* (2013.01); *H01M 10/4207* (2013.01); *H01M 10/488* (2013.01); *H01M 2010/4271* (2013.01)

(58) Field of Classification Search
CPC .. H02H 7/18; H01M 10/0525; H01M 10/488; H01M 2010/4271; H01M 10/4207; H01M 10/4257
See application file for complete search history.

(56) References Cited

U.S. PATENT DOCUMENTS

| 5,539,299 A * | 7/1996 | Fernandez ............ H02J 7/0031 320/134 |
| 5,781,390 A | 7/1998 | Notaro et al. |
| 5,909,103 A * | 6/1999 | Williams ............ H01M 10/425 320/134 |
| 6,049,140 A | 4/2000 | Alksnat et al. |

(Continued)

FOREIGN PATENT DOCUMENTS

| CN | 101123358 A | 2/2008 |
| CN | 101981781 A | 2/2011 |
| KR | 100576840 B1 | 5/2006 |

OTHER PUBLICATIONS

Chinese Office Action and Search Report for application CN 201280072620.5, dated Jun. 27, 2016, 6 pages.

(Continued)

*Primary Examiner* — Jared Fureman
*Assistant Examiner* — Esayas Yeshaw
(74) *Attorney, Agent, or Firm* — Cantor Colburn LLP

(57) ABSTRACT

Embodiments are directed to an apparatus comprising terminals providing a voltage, a monitor configured to receive an input from an entity external to the apparatus indicating that energy associated with the apparatus is to be selectively coupled to, or isolated from the terminals, and a protection mechanism coupled to the monitor and configured to be selectively turned on and turned off based on the input received from the external entity.

16 Claims, 3 Drawing Sheets

(56) References Cited

U.S. PATENT DOCUMENTS

| | | | | |
|---|---|---|---|---|
| 6,271,605 B1* | 8/2001 | Carkner | ............... | H02J 7/0031 307/125 |
| 9,108,523 B2* | 8/2015 | Kim | ............... | H02J 5/005 |
| 9,481,549 B2* | 11/2016 | Ishiguro | ............... | B66B 1/302 |
| 2004/0227492 A1* | 11/2004 | Lo | ............... | H02J 7/0031 320/134 |
| 2005/0077878 A1 | 4/2005 | Carrier et al. | | |
| 2008/0278116 A1* | 11/2008 | Matsunaga | ............... | H01M 10/44 320/134 |
| 2009/0195075 A1 | 8/2009 | Ziegler et al. | | |
| 2010/0117602 A1 | 5/2010 | Matsui et al. | | |
| 2010/0129700 A1* | 5/2010 | Tanno | ............... | H01M 10/441 429/93 |
| 2011/0062913 A1* | 3/2011 | Lin | ............... | H02J 7/0055 320/101 |
| 2011/0317321 A1* | 12/2011 | Vogel | ............... | H02H 3/025 361/87 |
| 2013/0249868 A1* | 9/2013 | Li | ............... | H02H 9/026 345/177 |
| 2014/0239901 A1* | 8/2014 | De Cock | ............... | H02J 7/0019 320/119 |

OTHER PUBLICATIONS

European Search Report for application EP12875274, dated May 27, 2016, 9 pages.
International Search Report for application PCT/US2012/034633, dated Dec. 26, 2012, 5 pages.
Written Opinion for application PCT/2012/034633, dated Dec. 26, 2012, 5 pages.

* cited by examiner

BATTERY FIELD DISCONNECT METHOD

BACKGROUND

Batteries are becoming increasingly prevalent in systems, such as elevator systems. Traditionally, batteries were used for rescue functions in the event of a power loss in the elevator system. In more recent times, elevator systems have used batteries as a power source for propulsion. A battery may be a source of significant stored energy. Installing or removing the battery without exposing oneself to hazardous energy may prove challenging.

Depending on the voltage or power level of the battery, a relay or manual switch may be used to disconnect terminals of the battery from the remainder of an elevator circuit. In some cases, specialized connectors may be used to prevent exposure to hazardous energy.

BRIEF SUMMARY

An embodiment is directed to an apparatus comprising terminals providing a voltage, a monitor configured to receive an input from an entity external to the apparatus indicating that energy associated with the apparatus is to be selectively coupled to, or isolated from the terminals, and a protection mechanism coupled to the monitor and configured to be selectively turned on and turned off based on the input received from the external entity.

An embodiment is directed to a method comprising receiving, by a monitor included in an apparatus, an input from an entity external to the apparatus indicating that energy associated with a battery of the apparatus is to be isolated from terminals of the apparatus, and causing, by the monitor, a protection mechanism to be driven to a state that isolates the energy from the terminals responsive to receiving the input.

An embodiment is directed to a method comprising receiving, by a monitor included in an apparatus, an input from an entity external to the apparatus indicating that energy associated with a battery of the apparatus is to be coupled to terminals of the apparatus, and causing, by the monitor, a protection mechanism to be driven to a state that couples the energy to the terminals responsive to receiving the input.

An embodiment is directed to a system comprising a controller configured to receive an input that selectively indicates whether energy associated with a battery is to be coupled to terminals associated with the battery, a monitor coupled to the controller and configured to receive a signal from the controller that indicates whether the energy is to be coupled to the terminals based on the input, and a protection mechanism coupled to the monitor and configured to be driven by the monitor so as to selectively couple the energy to the terminals based on the signal.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
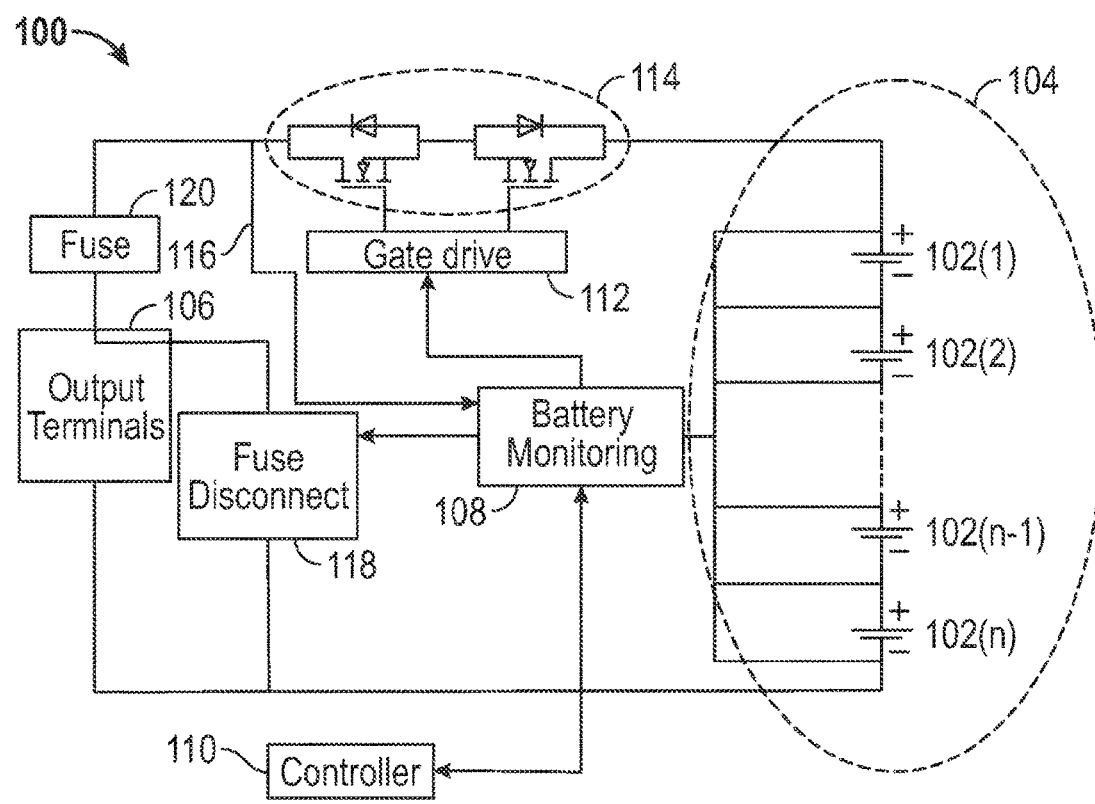
FIG. 1 illustrates an exemplary battery management architecture in an exemplary embodiment.

Exemplary embodiments of apparatuses, systems and methods are described for safely handling, installing, and/or removing a battery. The battery may be implemented as part of an elevator system. Embodiments may be used to selectively connect or disconnect the terminals of a battery from a circuit, such as a circuit associated with an elevator. In some embodiments, the terminals of the battery may be disconnected in order to perform maintenance or installation of the battery. In some embodiments, one or more systems, apparatuses, devices or components as described herein may effectively replace the use of relays, switches and/or specialized connectors. Such replacement may result in a cost savings.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect.

FIG. 1 illustrates a battery architecture 100 in an exemplary embodiment. The architecture 100 may be included as a part of an elevator. The architecture 100 may comprise a battery management architecture and may be configured to selectively couple or decouple energy of the battery to terminals associated with the battery.

The architecture 100 may include one or more cells. For example, as shown in FIG. 1, the architecture 100 may include a number 'n' of cells 102, denoted as 102(1), 102(2) . . . 102(n−1), and 102(n). The number 'n' of the cells 102 used in a particular elevator may be a function of the power requirements of the elevator system, which in turn may be based at least in part on the size or weight of the elevator, a capacity or load accommodated by the elevator, local or regional codes or regulations, or any other condition.

Considering the combination of the cells 102(1) through 102(n) together, the cells 102 may form a battery 104. The battery 104 may be used to supply power to the elevator system, such as propulsion power and/or rescue function power. The battery 104 may pose a risk to a person (e.g., a service technician or repairman) in the form of energy that may be present at terminals 106. The terminals 106 may be configured as an interface to the elevator and may supply power from the battery 104 to the elevator system.

In some embodiments, the architecture 100 may include a battery monitor 108. The battery monitor 108 may receive one or more signals from one or more entities, such as a controller 110. The interface between the battery monitor 108 and the controller 110 may take one or more forms. For example, the interface may comprise a discrete, a serial port, a controller area network (CAN) port, etc. The controller 110 may be a standalone component or integrated in another component or entity, such as the battery monitor 108. In some embodiments, the controller 110 may be external to the architecture 100.

The controller 110 may include, or be responsive to, one or more pushbuttons, switches, etc. For example, a person may depress a pushbutton or flip a switch on a breaker (not shown in FIG. 1) to indicate that the person is going to service one or more components of the elevator. Responsive to that depression or flip, the controller 110 may signal the battery monitor 108 that the battery monitor 108 should take an action to remove energy associated with the battery 104 from the terminals 106.

The battery monitor 108 may be configured to selectively couple or decouple the terminals 106 and the battery 104. For example, based a signal received from the controller 110, the battery monitor 108 may provide a signal to a drive 112. The drive 112 may either enable or disable (e.g., turn on or turn off) a set of series transistors, such as metal-oxide-semiconductor field-effect transistors (MOSFETs) 114, configured in a blocking format as shown in FIG. 1. Based on a state of a signal provided by the drive 112 to the MOSFETs 114, the MOSFETs 114 may be configured either to pass or block energy from the battery 104 to the terminals 106. As such, a person accessing the elevator system may be protected from exposure to the battery 104 when the MOSFETs 114 are disabled or turned off.

While the drive 112 and the MOSFETs 114 are shown in the architecture 100 of FIG. 1, in some embodiments, other components or devices may be used in place of, or in addition to, the drive 112 and the MOSFETs 114. For example, a contactor may be used in some embodiments. Any other type of protection mechanism may be used.

In some embodiments, the architecture 100 may include a backup or fail-safe mechanism in the event that the MOSFETs 114 do not isolate or disconnect the battery 104 from the terminals 106 when they are supposed to. For example, the battery monitor 108 may measure a parameter (e.g., power, energy, voltage, current, etc.) on a line 116. If the measured parameter associated with the line 116 exceeds a threshold, a determination may be made by the battery monitor 108 that the MOSFETs 114 failed to isolate or disconnect the battery 104 from the terminals 106. Such a condition may be indicative of damage to, or the inoperability of, the MOSFETs 114. When the battery monitor 108 determines that the MOSFETs 114 failed to isolate or disconnect the battery 104 from the terminals 106, the battery monitor 108 may signal a fuse disconnect 118 of such a status. Responsive to receiving the status regarding the failure from the battery monitor 108, the fuse disconnect 118 may activate a fuse 120. Upon being activated, the fuse 120 may "open," thereby permanently disconnecting the terminals 106 from the battery 104, at least until a point in time that the fuse 120 is reset or replaced.

In some embodiments, the battery monitor 108 may measure one or more parameters directly at the terminals 106 instead of, or in addition to, measuring the parameter(s) associated with the line 116. For example, measuring the parameter(s) at the terminals 106 may help to confirm that the fuse 120 activated or was opened responsive to being commanded to.

In some embodiments, one or more of the components and devices associated with the architecture 100 may be included in a battery. For example, the architecture 100 may be associated with a lithium ion battery management system. In some embodiments, a small switch or software command may be integrated with the battery management system, and protection circuitry typically associated with a manufacture or shipment of the battery may be commanded to operate in normal conditions, thereby removing hazardous energy from output terminals of the battery. The battery protection may prevent against cell failure due to, e.g., over/under voltage and may be leveraged at minimal cost to protect people, such as maintenance personnel.

The architecture 100 is illustrative. In some embodiments, one or more of the components of the architecture 100 may be optional. In some embodiments, additional components not shown may be included in the architecture 100. In some embodiments, the components of the architecture 100 may be arranged different from what is shown in FIG. 1. In some embodiments, one or more of the components may be included in a common casing or housing.

Figure 2:
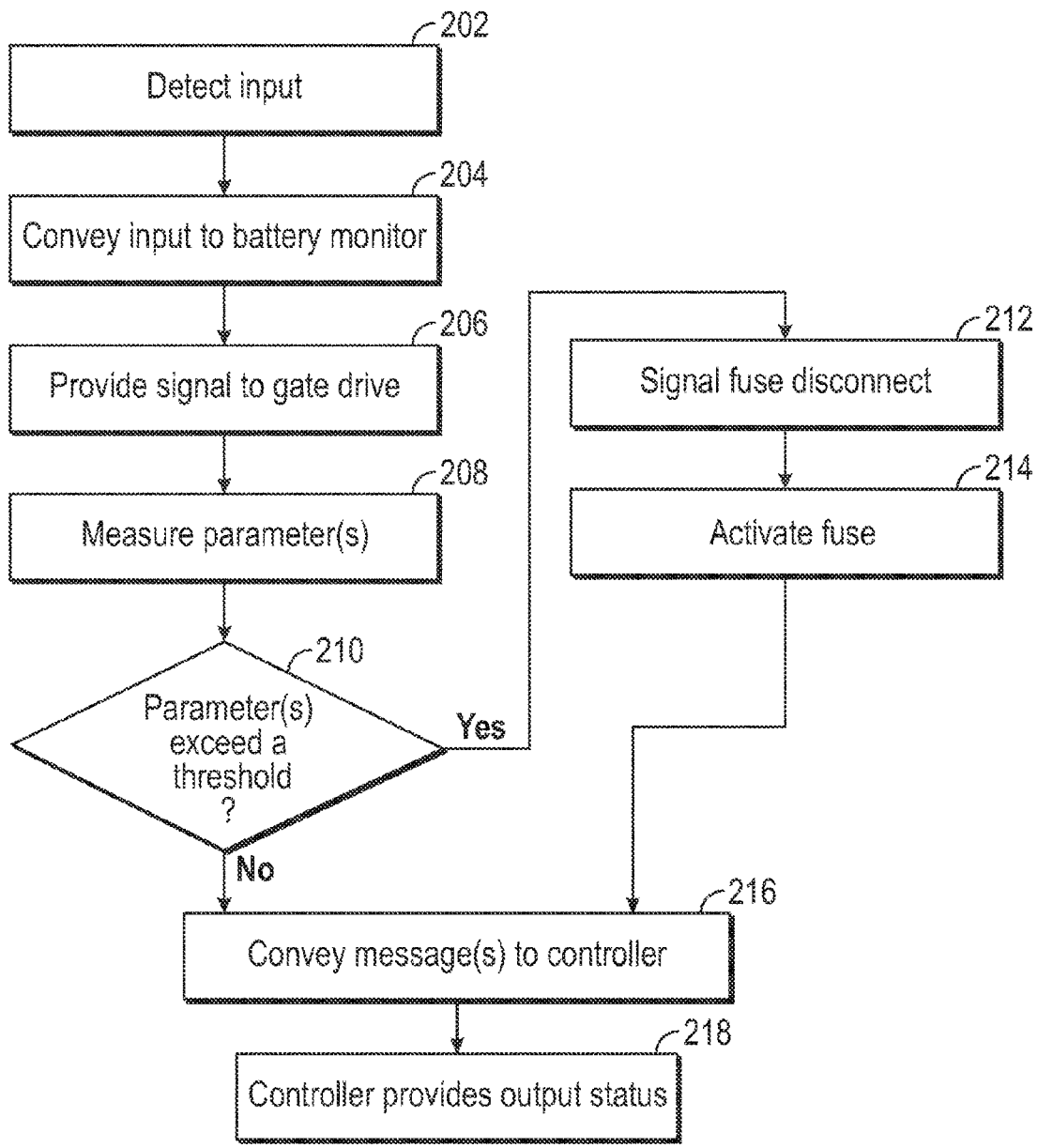
FIGS. 2-3 illustrate exemplary methods of operating a battery management architecture in an exemplary embodiment.

FIG. 2 illustrates a method that may be used in connection with one or more platforms or architectures. For ease of illustration, the method of FIG. 2 is described below in connection with the architecture 100 of FIG. 1. The method may be adapted to accommodate other architectures. The method of FIG. 2 may be used by personnel, for example, to maintain, remove, and/or install a battery in an elevator system or application.

In step 202, an input may be detected that indicates that personnel intends to work on or near one or more components of the elevator. For example, the personnel may flip a switch (e.g., on a breaker), depress a button, enter a command into a computer, or take some other action that may be associated with an intention to service the elevator. Servicing the elevator may include installing, removing, or repairing a battery associated with the elevator. In some embodiments, the controller 110 may receive the status or input indication associated with step 202.

In step 204, the input of step 202 may be conveyed to the one or more components, such as the battery monitor 108. For example, if the controller 110 is responsible for generating or receiving the input of step 202, the controller 110 may transmit the received input to the battery monitor 108 in step 204.

In step 206, the battery monitor 108 may provide a signal to the drive 112 responsive to receiving the input signal in step 204 that indicates that personnel intends to service the elevator. Responsive to receiving the signal, the drive 112 may bias the gates of the MOSFETs 114 so as to disable or turn off the MOSFETs 114, thereby isolating the battery 104 from the terminals 106.

In step 208, the battery monitor 108 may measure one or more parameters associated with, e.g., the line 116. For example, the battery monitor 108 may measure the parameter(s) on the line 116 to ensure that the MOSFETs 114 isolated the battery 104 from the terminals 106 in connection with step 206.

In step 210, the measured parameter(s) associated with step 208 may be compared to one or more thresholds. If the measured parameter(s) exceed a threshold (e.g., the "Yes" path out of step 210), the battery monitor 108 may signal the fuse disconnect 118 of such a status in step 212. Responsive to receiving the signal from the battery monitor 108 in step 212, the fuse disconnect 118 may activate the fuse 120 in step 214. Upon being activated, the fuse 120 may "open," thereby disconnecting the terminals 106 from the battery 104. Flow may then proceed from step 214 to step 216.

If the measured parameter(s) associated with step 208 do not exceed a threshold (e.g., the "No" path out of step 210), the battery monitor 108 may assume that the MOSFETs 114 isolated or disconnected the battery 104 from the terminals 106, such that the fuse 120 did not need to be activated. In this regard, flow may proceed from step 210 to step 216.

In step 216, the battery monitor 108 may convey one or more messages to an entity, such as the controller 110. For example, the battery monitor 108 may send a message to the controller 110 indicating the status of: (1) whether the MOSFETs 114 were successful in isolating or disconnecting the battery 104 from the terminals 106, (2) whether the fuse 120 was activated, and/or (3) the values of the measured parameter(s) associated with step 208.

Responsive to receiving the message of step 216, in step 218 the controller 110 may provide an output that may serve to indicate to personnel whether the isolation or the disconnection of the battery 104 from the terminals 106 succeeded, whether the fuse 120 was activated, and/or the values of the measured parameter(s) associated with step 208. The output provided by the controller 110 in step 218 may take any form, such as an email, a text message, an instant message, an audio message (e.g., a voicemail or phone call), a graphic displayed on a display screen, etc. In this manner, personnel may be reassured that the architecture 100 succeeded in isolating or disconnecting the battery 104 from the terminals 106. Personnel may condition performing the work or task on the elevator based on whether an indication of success is provided from, e.g., the controller 110 in step 218.

Figure 3:
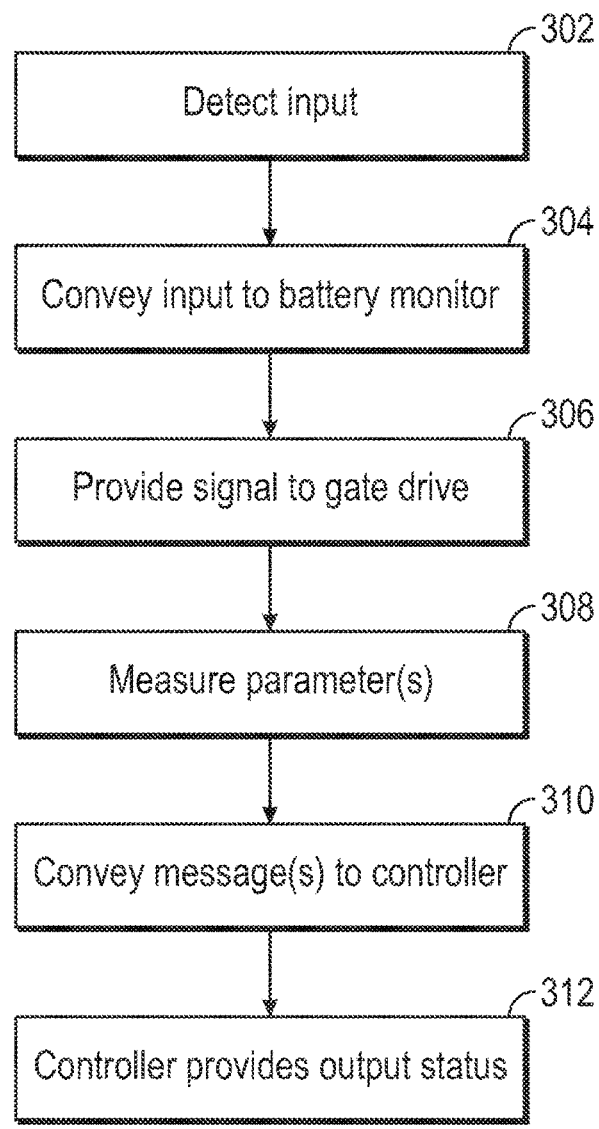

The method of FIG. 2 was described above in connection with isolating or disconnecting the battery 104 from the terminals 106 for purposes of, e.g., servicing an elevator. FIG. 3 illustrates a method of (re)connecting the battery 104 and the terminals 106. The method of FIG. 3 may be used by, e.g., personnel following a servicing of an elevator in order to restore battery power to the elevator system.

In step 302, an input may be detected by, e.g., the controller 110 that indicates personnel intends to restore battery power to the elevator system. For example, if in step 202 of FIG. 2 personnel flipped a switch of a breaker to indicate an intention to service the elevator, personnel may flip that same switch to the opposite position or state in step 302.

In step 304, the input of step 302 may be conveyed to the one or more components, such as the battery monitor 108. For example, if the controller 110 is responsible for generating or receiving the input of step 302, the controller 110 may transmit the received input to the battery monitor 108 in step 304.

In step 306, the battery monitor 108 may provide a signal to the drive 112 responsive to receiving the signal in step 304 that indicates that personnel intends to restore battery power to the elevator. Responsive to receiving the signal in step 306, the drive 112 may drive or bias the gates of the MOSFETs 114 so as to enable or turn on the MOSFETs 114, thereby coupling the battery 104 to the terminals 106. In some embodiments, the battery monitor 108 may condition commanding the drive 112 to turn on the MOSFETs 114 based on the fuse 120 being in a closed or conductive state. This may help to ensure that personnel do not attempt to reset or replace the fuse 120 with the MOSFETs 114 already having been turned on.

In step 308, the battery monitor 108 may measure one or more parameters associated with, e.g., the line 116. For example, the battery monitor 108 may measure the parameter(s) on the line 116 to ensure that the MOSFETs 114 coupled the energy of the battery 104 to the terminals 106 in connection with step 306.

In step 310, the battery monitor 108 may convey one or more messages to an entity, such as the controller 110. For example, the battery monitor 108 may send a message to the controller 110 indicating the status of: (1) whether the MOSFETs 114 were successful in coupling the energy of the battery 104 to the terminals 106, and/or (2) the values of the measured parameter(s) associated with step 308.

An output status associated with one or more of the messages of step 310 may be output by the controller 110 in step 312. In this manner, personnel may receive confirmation from the battery monitor 108 (potentially by way of the controller 110) that battery power has been restored to the elevator.

The methods illustrated in connection with FIGS. 2 and 3 are illustrative. In some embodiments, one or more of the steps (or portions thereof) may be optional. In some embodiments, additional steps not shown may be included. In some embodiments, the steps may execute in an order or sequence different from what is shown.

Embodiments have been described in terms of the control and management of a battery used in an elevator application. One skilled in the art will appreciate that embodiments may be adapted to accommodate different types of application environments. For example, the embodiments may be adapted to accommodate any application environment associated with power generation or power consumption, such as a heating or air conditioning/refrigeration application.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Embodiments may be tied to one or more particular machines. For example, a battery management architecture may be configured to selectively connect or disconnect the terminals of a battery to one or more systems, such as an elevator system or circuit. In some embodiments, the battery management architecture may be responsive to a command or signal generated by an external source. In some embodiments, the battery management architecture may provide a message or signal that conveys a status of the battery management architecture.

Embodiments may transform an article into a different state or thing. For example, a battery that otherwise might have hazardous energy available at its terminals may be placed in a state such that a person that comes into contact with the terminals is not exposed to that energy. In this manner, maintenance, repair, installation, and other activities may take place at substantially less risk.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:
1. An apparatus comprising:
   terminals providing a voltage;
   a fuse;
   a monitor configured to receive an input indicating that energy associated with the apparatus is to be selectively coupled to, or isolated from the terminals; and a protection mechanism coupled to the monitor and configured to be selectively turned on and turned off based on the input;

wherein the monitor is configured to:
responsive to receiving the input indicating the apparatus is to be isolated from the terminals, measure at least one parameter associated with the protection mechanism;
cause the fuse to be activated when the measured at least one parameter exceeds a threshold; and
convey a message regarding a status of the measured at least one parameter, wherein the status includes an indication of whether the fuse was activated.

2. The apparatus of claim 1, wherein the monitor and the protection mechanism are included in the apparatus when the apparatus is manufactured.

3. The apparatus of claim 1, wherein the protection mechanism comprises a plurality of MOSFETs arranged in a blocking format.

4. The apparatus of claim 3, further comprising:
a drive coupled to the monitor and the MOSFETs and configured to bias a gate of each of the plurality of MOSFETs based on an input received from the monitor.

5. The apparatus of claim 1, further comprising:
a plurality of cells arranged as a battery,
wherein the energy is provided by the battery.

6. The apparatus of claim 1, wherein the apparatus is associated with an elevator, and wherein the input is associated with at least one of a service activity, a maintenance activity, and an installation activity with respect to the elevator.

7. A method comprising:
receiving, by a monitor included in an apparatus, an input to the apparatus indicating that energy associated with a battery of the apparatus is to be isolated from terminals of the apparatus; and
causing, by the monitor, a protection mechanism to be driven to a state that isolates the energy from the terminals responsive to receiving the input;
measuring, by the monitor, at least one parameter associated with the protection mechanism;
wherein when the measured at least one parameter exceeds a threshold, the monitor is configured to cause a fuse coupled to the terminals of the apparatus to activate; and
wherein the monitor is configured to convey a message regarding a status of the measured at least one parameter, wherein the status includes an indication of whether the fuse was activated.

8. The method of claim 7, wherein the monitor and the protection mechanism are included in the apparatus when the apparatus is manufactured.

9. The method of claim 7, wherein the protection mechanism comprises a plurality of transistors arranged in a blocking format and coupled to the battery and the terminals, the method further comprising:
causing, by the monitor, at least one of the transistors to be turned off to isolate the energy associated with the battery from the terminals.

10. The method of claim 7, wherein the apparatus is associated with an elevator, and wherein the input is associated with at least one of a service activity, a maintenance activity, and an installation activity with respect to the elevator.

11. A method comprising:
receiving, by a monitor included in an apparatus, an input to the apparatus indicating that energy associated with a battery of the apparatus is to be coupled to terminals of the apparatus;
determining that a fuse coupled to the terminals of the apparatus is closed;
based at least in part on the determination that the fuse is closed, causing, by the monitor, a protection mechanism to be driven to a state that couples the energy to the terminals responsive to receiving the input.

12. The method of claim 11, wherein the protection mechanism comprises a plurality of transistors arranged in a blocking format and coupled to the battery and the terminals, the method further comprising:
causing, by the monitor, each of the transistors to be turned on to couple the energy associated with the battery to the terminals.

13. The method of claim 10, wherein the apparatus is associated with an elevator, and wherein the input is associated with at least one of a service activity, a maintenance activity, and an installation activity with respect to the elevator.

14. A system comprising:
a controller configured to receive an input that selectively indicates whether energy associated with a battery is to be coupled to terminals associated with the battery;
a fuse coupled to the terminals associated with the battery;
a monitor coupled to the controller and configured to receive a signal from the controller that indicates whether the energy is to be coupled to the terminals based on the input; and
a protection mechanism coupled to the monitor and configured to be driven by the monitor so as to selectively couple the energy to the terminals based on the signal;
wherein the monitor is configured to:
responsive to receiving the input indicating the energy is to be coupled to the terminals, determine that the fuse is closed;
based at least in part on the determination that the fuse is closed, causing the protection mechanism to be driven to a state that couples the energy to the terminals.

15. The system of claim 14, wherein the battery is a lithium ion battery, and wherein the monitor and the protection mechanism are included in a lithium ion battery management system of the lithium ion battery when the lithium ion battery is manufactured, and wherein the lithium ion battery management system is used to protect the lithium ion battery when the lithium ion battery is shipped.

16. The system of claim 14, wherein the monitor is configured to measure a parameter associated with the protection mechanism, and wherein the monitor is configured to convey a message to the controller that provides a status of whether the energy is coupled to the terminals, and wherein the controller is configured to provide the status associated with the message as at least one of: an email, a text message, an instant message, a voicemail, a phone call, and a graphic displayed on a display screen.

* * * * *